Dec. 30, 1930.  C. E. MAYNARD  1,786,499
PRESS FOR TREAD SPLICES
Filed April 17, 1929
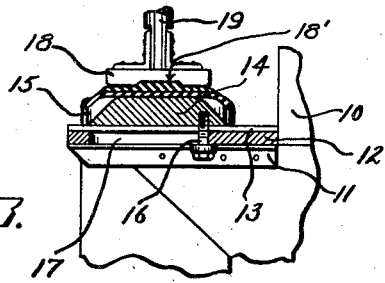
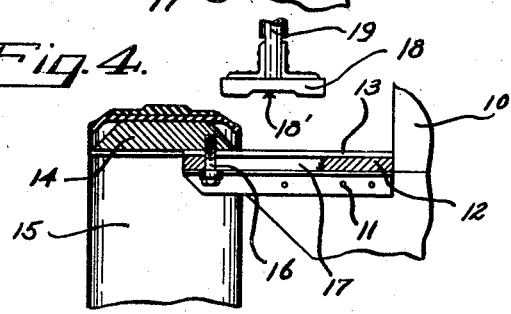
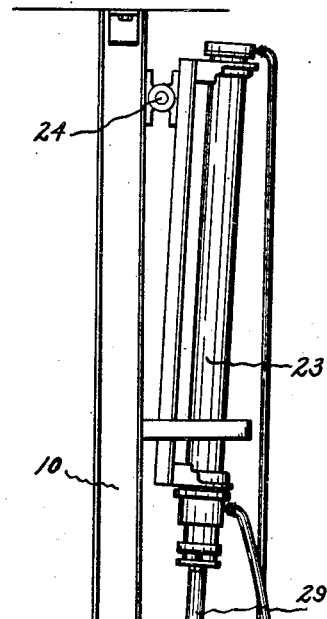
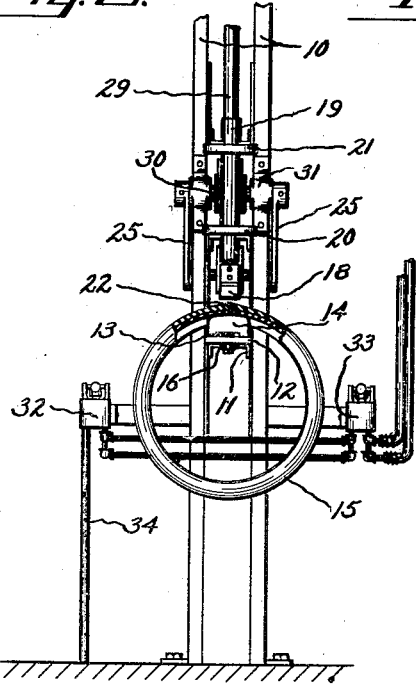
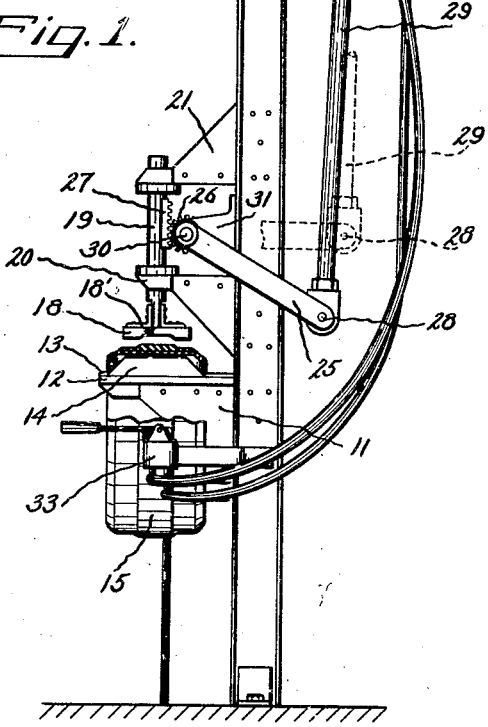
INVENTOR.
CHARLES EDGAR MAYNARD
BY
ATTORNEY.

Patented Dec. 30, 1930

1,786,499

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

PRESS FOR TREAD SPLICES

Application filed April 17, 1929. Serial No. 355,779.

My invention relates to an apparatus used in the manufacture of pneumatic tire casings for exerting a large pressure on the casing at the portion where the thread is spliced together. When casings are expanded into tire shape from the flat or semi-flat form in which they are built, the tread splice will open up unless it has been firmly stitched together. Open tread splices, if not repaired before the tire is cured, will cause defective tires due to trapped air at that point.

The object of my invention is to provide an apparatus that will exert a pressure at the tread splice portion of the tire that will insure a tight, unyielding splice. Another object is to provide an apparatus of simple construction that will perform the operation expeditiously.

In the accompanying drawings which illustrate one embodiment of my invention:

Fig. 1 is a side elevation of the apparatus with a tire casing in place, partially broken away, ready to be pressed;

Fig. 2 is a front view of the lower part of the apparatus shown in Fig. 1;

Fig. 3 is a sectional view of the pressing members operating on a tire; and

Fig. 4 is a view similar to Fig. 3 showing how the casing may be brought into the "bite" of the pressing members.

The apparatus consists of a pair of uprights 10 which may be mounted between the floor and ceiling or otherwise supported. Fixed to the uprights 10 is support 11 for a plate 12 provided with ways 13 and adapted to slidably support a press body 14 upon which a casing 15 may be hung. A screw 16 carried by the body 14 fits through a slot 17 in the plate 12 for the double purpose of retaining the body 14 on the plate 12 and also for acting as a stop for the operating and casing receiving positions of the body 14.

A press plate 18 having a tread engaging surface 18' shaped to conform substantially to the contour of the tread is fixed to a bar 19. This bar, reciprocable in supports 20 and 21, similar to support 11, is centralized above the operating position of the body 14 and is adapted to bring the plate 18 down onto the casing 15 carried by the body to press the two parts of the splice 22 firmly together.

A yielding pressure is used in this pressing operation and is supplied by means of an air cylinder 23 pivotally mounted at 24 to the upper end of the uprights 10 and acting through arms 25, gear 26 and rack 27. The arms 25 are hinged at one end 28 to the end of the piston rod 29 of cylinder 23 and are keyed at the other end to a shaft 30 carrying the gear 26, the shaft being mounted in bearings 31 fixed to the upright 10.

The rack 27, which meshes with the gear 26, is fixed to the bar 19 so that movement of the gear will bring the press-plate into or out of engagement with the casing 15 on the body 14.

The air cylinder 23 is controlled by a pair of valves 32 and 33 connected in tandem with the air supply line 34 so that both valves must be operated simultaneously in order to move the piston rod 29 and thus move the press-plate into engagement with the casing. Due to this arrangement of the valves both of the operator's hands are kept out of the "bite" of the press.

Having thus described my invention, I claim:

1. An apparatus of the character described comprising a pair of tread pressing plates adapted to press a narrow portion of a tire between them, a rack fixed to one of said plates, a gear meshing with the rack, and means for causing the rotation of the gear thereby moving the rack-bearing plate toward and away from the other plate.

2. A device for securing together the spliced ends of the tread portion of an uncured pneumatic tire casing which comprises a pressure member having a tread engaging surface shaped to conform substantially to the contour of the tread, a support for the tire casing movable into alignment with the pressure member and means to move the latter into operative engagement with spliced portion of the tread.

CHARLES EDGAR MAYNARD.